Aug. 15, 1967  R. F. DAVIS, JR  3,335,751
CHECK VALVE
Filed Jan. 15, 1964  2 Sheets-Sheet 1
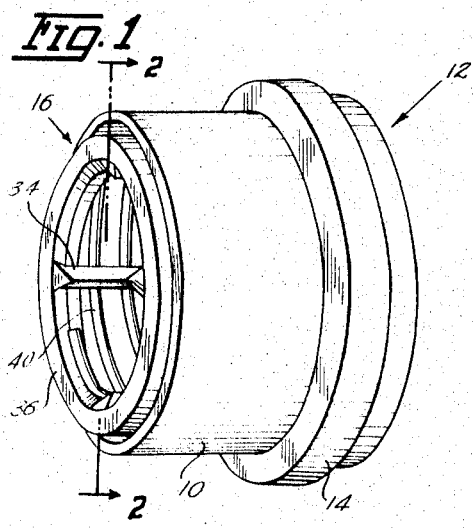
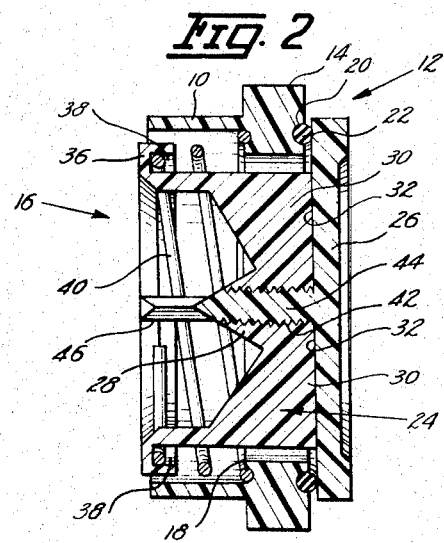
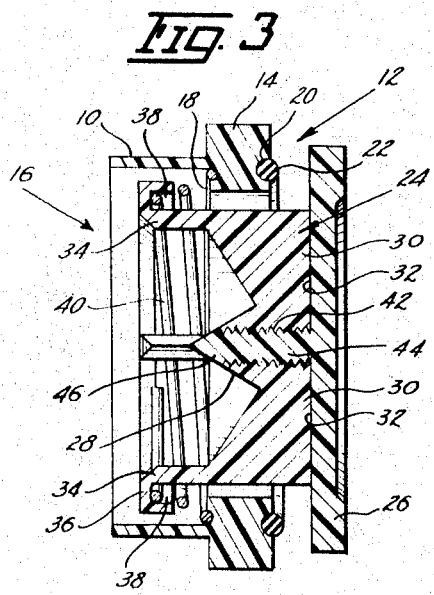
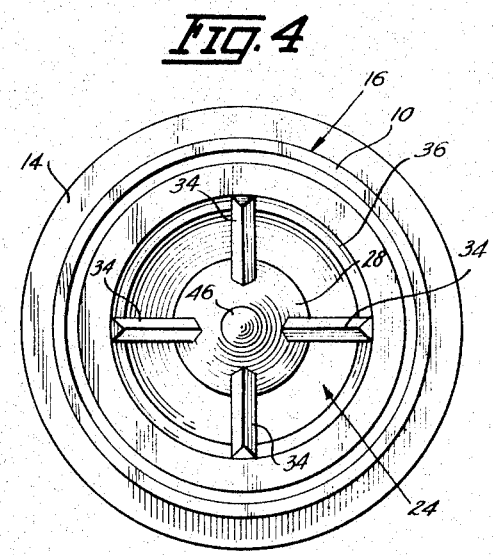
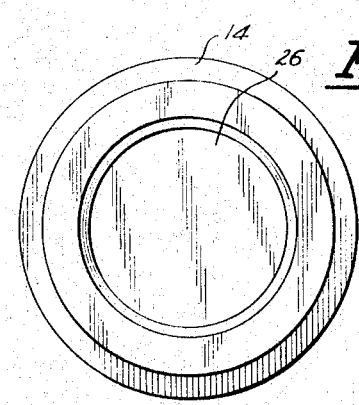
INVENTOR.
ROY FORREST DAVIS, JR.
BY Morton S. Adler
ATTORNEY.

Aug. 15, 1967  R. F. DAVIS, JR  3,335,751
CHECK VALVE
Filed Jan. 15, 1964  2 Sheets-Sheet 2
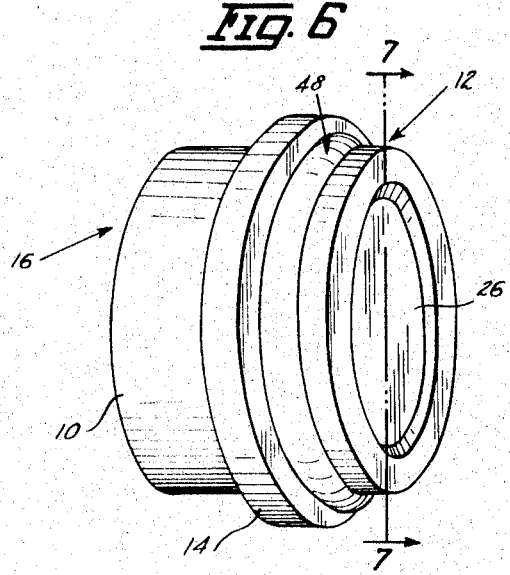
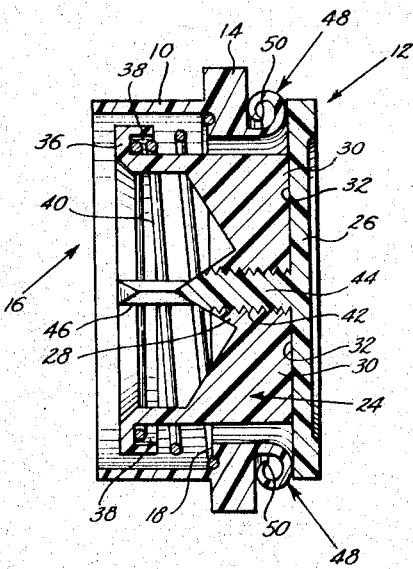
INVENTOR.
ROY FORREST DAVIS, JR.
BY Morton S. Adler
ATTORNEY.

United States Patent Office
3,335,751
Patented Aug. 15, 1967

3,335,751
CHECK VALVE
Roy Forrest Davis, Jr., 818 E. 22nd St. Court,
Des Moines, Iowa 50317
Filed Jan. 15, 1964, Ser. No. 337,775
5 Claims. (Cl. 137—541)

This invention relates to check valves and is an improvement over the valve disclosed in United States Patent No. 2,956,584, of which I am one of the joint inventors.

According to the present invention, there is provided an improved yoke structure to facilitate the flow of gas, air or fluids through this valve and thereby minimize and eliminate for all practical purposes any turbulence at the inner side of the valve cap. More particularly, this is accomplished by a novel yoke and cap assembly which presents a needle point projection axially into the line of flow for uniformly diverting the flow of gas, air or fluid throughout the area of the outlet end of the valve.

A further object contemplated by this invention is the provision of an improved valve cap seat formed at one end of a cylindrical valve housing by providing such end with a coiled or rolled edge. This new seat has the advantage of providing a cushioning effect which permits a tight seal of the cap irrespective of any possible disfigurement in the cap and in addition, such seat, under repeated contact with the valve cap, has a tendency to accentuate the rolled configuration so as to progressively present an unworn surface at the seating area.

These and other objects and advantages of this invention reside in the details of construction and correlation of the various parts and will be apparent as the description proceeds.

To attain these objects and such further objects as may appear herein, or be hereinafter pointed out, reference is made to the accompanying drawings forming a part hereof, in which:

FIG. 1 is a perspective view of this new check valve,

FIG. 2 is a cross-sectional view taken on the line 2—2 of FIG. 1 showing the valve cap in closed position, FIG. 3 is similar to FIG. 2 but showing the valve cap in open position, FIG. 4 is an end elevational view from the inlet end of this valve, FIG. 5 is an end elevational view from the valve cap end thereof, FIG. 6 is a perspective view of a modified form of this valve showing the new rolled valve cap seat, and FIG. 7 is a cross-sectional view of the check valve shown in FIG. 6.

Referring to the drawings, a cylindrical hollow valve body or housing is designated by the numeral 10, and in the embodiment shown in FIGS. 1–5 terminates at the outlet end 12 in the annular flange 14 by which the diameter of body 10 at end 12 is somewhat reduced relative to the inlet end 16 and thereby forms the internal annular shoulder 18. The surface of flange 14 opposite to shoulder 18 is provided with the annular groove 20 for receiving an O-ring 22 to serve as a valve seat as will become apparent. Thus far described, it will be understood that body 10 will normally be placed within a pipe flow line (not shown) and that the diameter of body 10 and flange 14 may be varied as needed to be accommodated to any particular pipe or fitting used for mounting a check valve therein as is well known.

Within body or housing 10 there is mounted what I have called the yoke, indicated generally by the numeral 24, to which the valve cap 26 is attached and operates as follows. Yoke 24 includes a center truncated cone-shaped portion 28 having its truncated end disposed toward the inlet end 16 of body 10. A plurality of equally spaced gussets 30 project radially from portion 28 and each has an edge 32 disposed toward the outlet end 12 of body 10 which is coplanar with the corresponding end of portion 28 to serve as a support for cap 26. Each gusset 30 at its outer end includes an integral finger 34 which extends a like distance toward inlet end 16 parallel to the axis of body 10 and are each secured to the ring member 36. The periphery of ring 36 includes a channel 38 that encircles the ends of fingers 34 and provides a seat for one end of a coil spring 40, with the other end of such spring being seated against shoulder 18 to normally urge yoke 24 toward the inlet end 16. Portion 28 is provided with a threaded bore 42 (FIGS. 2 and 3) which receives the threaded shank 44 that projects axially from the disk-like cap 26. The end 46 of shank 44 is conical and the length of shank 44 is such so that when cap 26 is attached to portion 28 as indicated, portion 28 is changed from its truncated configuration to conical and with its apex axially disposed relative to body 10.

The diameter of cap 26 is such that it will seat against the O-ring 22 as best seen in FIG. 2 and spring 40 will normally hold cap 26 in closed position. In operation, cap 26 is moved to open position (FIG. 3) under pressure from the flow of gas, air or fluids through body 10 in a well-known manner and portion 28 will provide a uniform diversion thereof throughout the area of the outlet end 12. This substantially eliminates all turbulence in a valve of this type that is customarily created at the inner side of the valve cap structure.

Reference is now made to FIGS. 6 and 7 relative to my new rolled edge valve cap seat 48 which is provided on a valve structure as shown in FIG. 2, and thus like parts will be given like numerals. Seat 48 in its initial form is a concentrically reduced thin extension or projection of body 10 from flange 14 on the outlet side 12 as can be determined from FIG. 7. The edge of such projection, represented by the numeral 50, is then rolled or coiled outwardly to the shape illustrated and for this purpose, body 10 is formed from any suitable material that is susceptible of such deformation under pressure when heated or cold. For my purposes, I have preferably used a thermoplastic material, and cold rolled edge 50 by turning body 10 at a high r.p.m. in a lathe and applying a suitable tool against the inner side of edge 50 in a well-known manner. This will produce the coiled rolled edge that serves as seat 48 and the rolled or coiled formation creates a cushion seating or sealing effect relative to cap 26 so that a tight seal is accomplished irrespective of any disfigurement that might be present in the seating portion of the cap. It is also pointed out that under repeated operations of cap 26 against seat 48, such seat has a tendency to accentuate the rolled or coil formation so as to not only progressively present a new seat area or portion, but to increase its resilient cushioning effect and thereby assure a tight seal contact with the cap instead of becoming less fluid tight with wear as is normally the case with other valve types.

Accordingly, from the foregoing, it is thought a full understanding of the construction and operation of this check valve will be had and that the several advantages of the same will be appreciated.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:
1. A check valve comprising:
   a cylindrical body defining an inlet end and outlet end and having a valve seat on said outlet end,
   a yoke member movably disposed within said body,
   yielding means cooperating with said body and yoke member to normally urge said yoke member toward said inlet,
   said yoke member including a center truncated cone shaped portion axially disposed relative to said body and having its truncated end extending toward said inlet end,
   said center portion being provided with a threaded bore concentric with the axis of said body,
   a disk shaped cap provided with an axially projecting threaded shank having a conical end,
   said shank being threadably engaged in said bore so that said conical end extends through the truncated end of said center portion whereby said center portion with said cap attached becomes conical in shape, and
   said cap when attached to said center section being normally in sealing engagement with said valve seat.
2. A device as defined in claim 1 wherein said valve seat comprises an outwardly coil rolled edge at the outlet end of said body.
3. A check valve comprising:
   a cylindrical body defining an inlet end and outlet end and having a valve seat on said outlet end,
   a cap member,
   yielding means within said body cooperating therewith and with said cap member to normally urge said cap member into sealing engagement with said valve seat,
   a conical member within said body operatively associated with said cap member,
   the apex of said conical member being axially disposed relative to said body and extending toward said inlet end, and
   said valve seat comprises an outwardly coil rolled edge at the outlet end of said body.
4. In a check valve for fluid, gas or air of the class having a housing with an inlet and outlet end respectively, a valve seat on said outlet end, and a yieldably mounted cap normally in sealing engagement with said valve seat, the combination therewith of means within said housing adjacent said cap to uniformly disperse the flow of fluid, gas or air toward the perimeter of said outlet end and thereby prevent turbulence of said flow adjacent said cap, said means comprising a conical diverter axially disposed in said housing and having its apex extending toward said inlet end, and said valve seat comprises an outwardly coil rolled edge at the outlet end of said body.
5. In a check valve which includes a cylindrical housing defining an inlet end and an outlet end, the combination therewith of an improved valve seat comprising an outwardly coiled rolled edge at said outlet end to provide a cushioning reaction.

References Cited

UNITED STATES PATENTS

| | | | |
|---|---|---|---|
| 1,671,139 | 5/1928 | Wilson | 251—334 |
| 2,524,951 | 10/1950 | Ashton | 137—542 |
| 2,956,584 | 10/1960 | Anderson et al. | 137—541 |
| 3,001,546 | 9/1961 | Salisbury | 137—541 |
| 3,026,899 | 3/1962 | Mischanski | 257—368 X |
| 3,060,961 | 10/1962 | Conley | 257—333 X |

FOREIGN PATENTS 1,035,787   4/1951   France.

WILLIAM F. O'DEA, *Primary Examiner.*

D. H. LAMBERT, *Assistant Examiner.*